US011351938B2

(12) United States Patent
Benedetti et al.

(10) Patent No.: US 11,351,938 B2
(45) Date of Patent: Jun. 7, 2022

(54) DEVICE FOR SUPPORTING CABLES FOR ARTICULATED VEHICLES (71) Applicant: P.E.I. Protezioni Elaborazioni Industriali S.r.L., Calderara di Reno (IT)

(72) Inventors: Michele Benedetti, Bologna (IT); Vittorio Mardegan, San Giovanni in Croce (IT)

(73) Assignee: P.E.I. PROTEZIONI ELABORAZIONI INDUSTRIALI S.R.L., Calderara di Reno (IT)

( * ) Notice: Subject to any disclaimer, the term of this patent is extended or adjusted under 35 U.S.C. 154(b) by 0 days.

(21) Appl. No.: 17/147,757

(22) Filed: Jan. 13, 2021

(65) Prior Publication Data
US 2021/0221307 A1 Jul. 22, 2021

(30) Foreign Application Priority Data
Jan. 22, 2020 (IT) .................. 102020000001165

(51) Int. Cl.
*B60D 1/64* (2006.01)
*B60R 16/02* (2006.01)

(52) U.S. Cl.
CPC ............ *B60R 16/0215* (2013.01); *B60D 1/64* (2013.01)

(58) Field of Classification Search
CPC ............................... B60R 16/0215; B60D 1/64
USPC ....................................................... 174/72 A
See application file for complete search history.

(56) References Cited

U.S. PATENT DOCUMENTS

| 2018/0215219 A1* | 8/2018 | Browne ................. B60D 5/006 |
| 2019/0176724 A1 | 6/2019 | Yamashita et al. |

FOREIGN PATENT DOCUMENTS

| DE | 102010011903 A1 | 11/2011 |
| EP | 1894789 A1 | 3/2008 |

OTHER PUBLICATIONS

Italian Search Report dated Sep. 24, 2020 from counterpart Italian Patent Application No. 102020000001165.

\* cited by examiner

*Primary Examiner* — Timothy J Thompson
*Assistant Examiner* — Michael F McAllister
(74) *Attorney, Agent, or Firm* — Shuttleworth & Ingersoll, PLC; Timothy Klima (57) ABSTRACT

A cable supporting device for articulated vehicles, designed for installing in an intercommunicating compartment between two adjacent cabins of an articulated vehicle, including at least one cable-holder element, defining internally at least one channel for housing at least one cable, two anchoring plates connected or connectable to respective ends of the cable-holder element and each configured for stable mounting to a different end portion of the articulated vehicle, and at least one connecting element, positioned for connecting between at least one end of the cable-holder element and the respective anchoring plate. In particular, the connecting element is configured to allow a reciprocal movement, between the respective end of the cable-holder element and the respective anchoring plate, at least about two axes of rotation which are not parallel to each other and preferably perpendicular to each other.

12 Claims, 6 Drawing Sheets

DEVICE FOR SUPPORTING CABLES FOR ARTICULATED VEHICLES

This application claims priority to Italian Patent Application 102020000001165 filed Jan. 22, 2020, the entirety of which is incorporated by reference herein.

BACKGROUND OF THE INVENTION

This invention relates to a device for supporting cables for articulated vehicles, in particular articulated buses, as well as an articulated vehicle fitted with the cable supporting device.

SUMMARY OF THE INVENTION

In particular, the invention can be advantageously applied in the road sector, where the cable supporting device may be installed in an intercommunicating compartment between two cabins, that is, carriages used for adjacent passenger transport of an articulated bus.

This intercommunicating compartment must inevitably guarantee the passage between the two cabins of the cables which make it possible to connect the various user outlets present on the rear cabin (for example, lights, information systems, air conditioning systems, control systems) with the central panel usually located in the front cabin.

As is known, these cables run in an upper portion of the intercommunicating compartment, housed in special cable-holder devices, which support the cables and protect them from mechanical stresses.

Firstly, these devices must be structured in such a way as to guarantee a rigidity which is adequate for supporting the weight force exerted by the cables in such a way as to keep them in position without letting them fall into the cabin.

Moreover, since there is a relative movement between the cabins during the driving operations of the vehicle, especially when a steering must be performed, it is advantageous to make the cable-holder device flexible in a plane lying substantially parallel to the plane of travel of the vehicle in such a way that it can adapt to the various configurations adopted by the intercommunicating compartment during a misalignment in a horizontal direction of the cabins.

Moreover, these cable-holder devices are anchored to end portions of the frame of the cabin, using typically rigid anchoring systems which securely constrain the ends of the cable-holder device to the respective cabin.

However, this solution has drawbacks.

Since the road surface is not perfectly uniform, having, for example, dips and bumps, and since during driving the vehicle may have to rise up and move down slopes, it is impossible to prevent cabins from becoming subject to misalignment in a vertical direction and to changes of reciprocal orientation.

These reciprocal movements cause a series of mechanical stresses to which the cable-holder device cannot adapt due to the substantially rigid arrangement on a plane perpendicular to the ground which is necessary in order to guarantee the correct support of the cables.

These mechanical stresses, not absorbed by the cable-holder device, directly affect the anchors which, consequently, deteriorate and become damaged.

In this context, the aim of the invention is to meet the above-mentioned needs by providing a cable-holder device which is able to overcome the drawbacks of the prior art.

In particular, the aim of the invention is to provide a cable-holder device which is able to mechanically withstand the stresses caused by the movement of the vehicle, in particular the stresses caused by the misalignment of the cabins of the articulated vehicle, irrespective of the type of misalignment which occurs.

These and other aims which will become more apparent in the description below are substantially achieved by a cable supporting device for articulated vehicles as well as by an articulated vehicle mounting the cable supporting device according to the appended claims.

The features and advantages of the invention will emerge more clearly from the detailed description of preferred, but not exclusive embodiments of the device.

BRIEF DESCRIPTION OF THE DRAWINGS

The device is described below with reference to the accompanying drawings which are provided solely for purposes of illustration and in which.

DESCRIPTION OF THE PREFERRED EMBODIMENTS

With reference to the accompanying drawings, the numeral 1 denotes in its entirety a device for supporting cables for articulated vehicles which, for simplicity of description, will hereafter be referred to as device 1.

In this description, the term "articulated vehicles" is used to mean a road vehicle, similar to normal buses, but having a greater capacity for passengers as it consists of two cabins connected in a flexible fashion (preferably by a fifth wheel).

Figure 1:
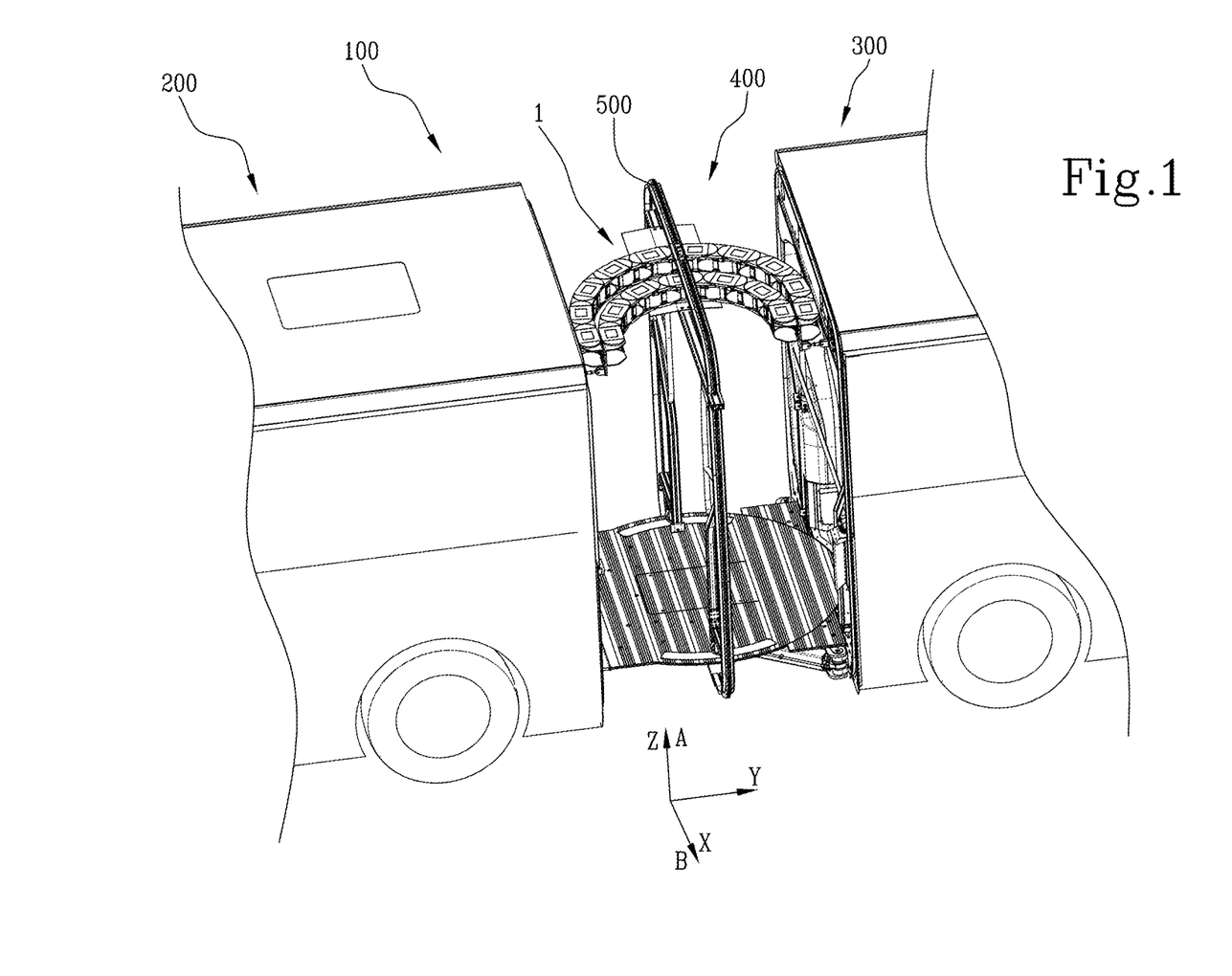
FIG. 1 schematically illustrates of an outer view of an articulated vehicle mounting the cable supporting device according to the invention.

FIG. 1 shows a detail of an articulated vehicle 100 having two cabins, that is to say, two units used for transporting passengers 200, 300 which are adjacent to each other and wherein an intercommunicating compartment 400 is interposed, designed for the installation of the device 1 and for the passage of the passengers.

In particular, the device 1 is designed to be installed in an upper portion of the intercommunicating compartment 400.

Substantially, the device 1 comprises at least one cable-holder element 2, two anchoring plates 3 and on each of said plates a connecting element 4.

Figure 2A:
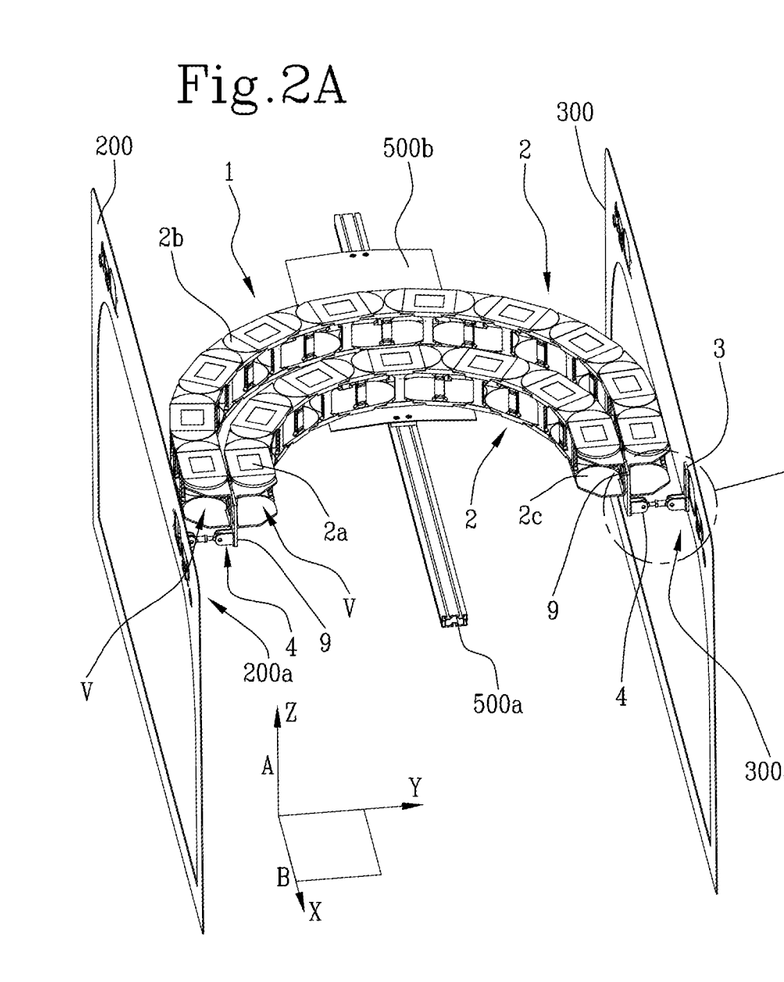
FIGS. 2A-2C schematically illustrate a detail of the articulated vehicle of FIG. 1.
Figure 2B:
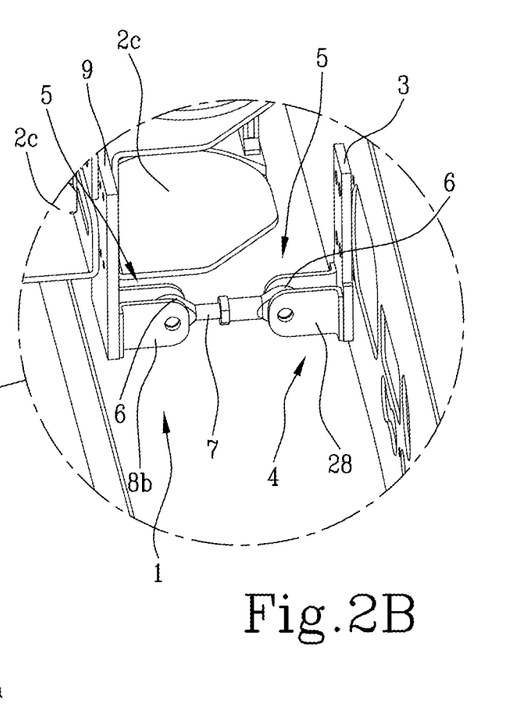
Figure 2C:
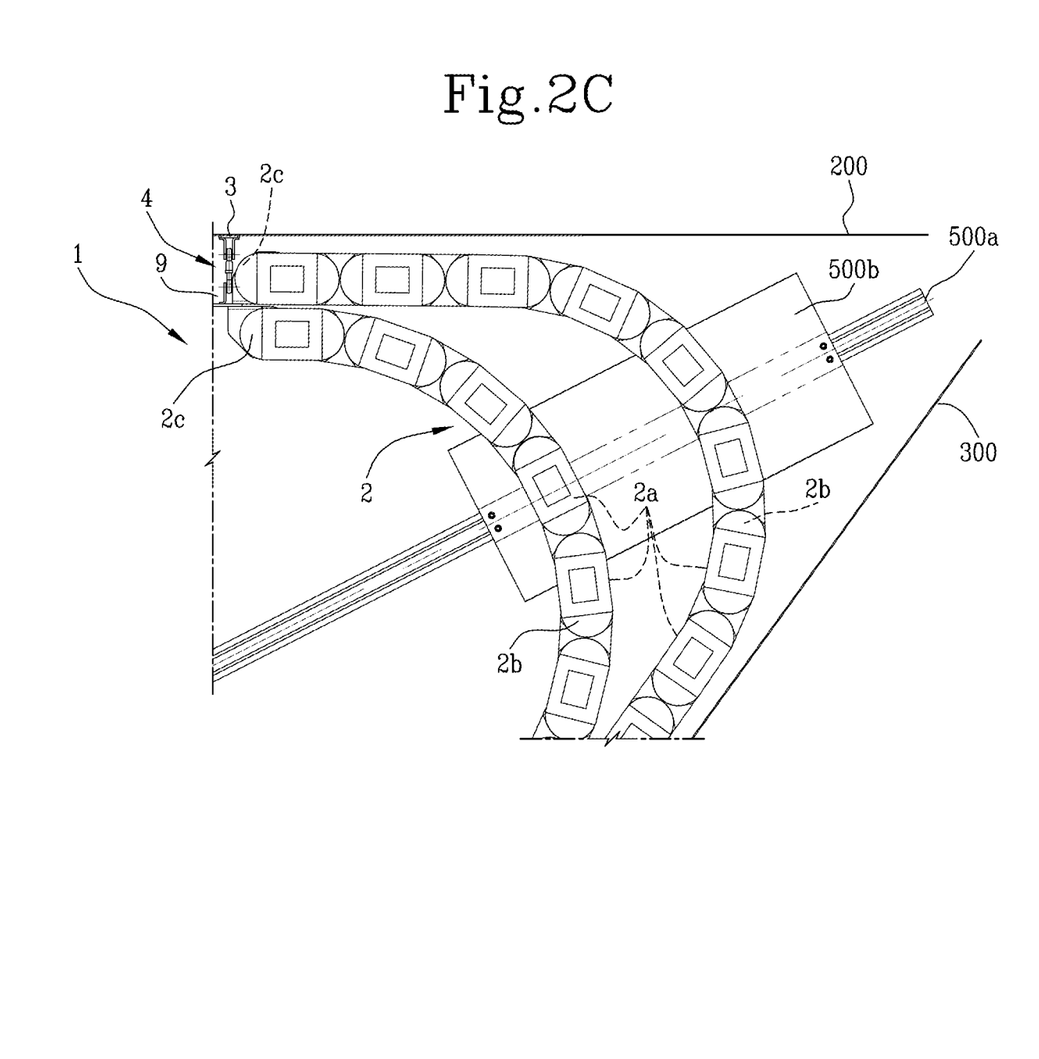

The cable-holder element 2, shown in detail in FIGS. 2A-2C, has an elongate structure extending along a line of extension substantially lying in a lying plane "XY".

Preferably, in use the lying plane "XY" is horizontal or in any case parallel to the ground on which the articulated vehicle 100 moves on which the device 1 is installed.

Moreover, the cable-holder element 2 is flexible on the lying plane "XY".

In other words, the cable-holder element 2 has a structure such as to allow the cable-holder element 2 to bend (within predetermined limits), without damage, so as to adapt to various configurations adopted by the intercommunicating compartment 400 during the normal operations for moving the articulated vehicle 100.

In other words, in use, the two cabins 200, 300 might move relative to each other, becoming misaligned.

Generally speaking, it is seen that there is a misalignment between the two cabins every time the head cabin changes its direction of travel, especially on account of the shape of the ground.

Moreover, the cable-holder element 2 is substantially rigid in a plane "YZ" perpendicular to the lying plane "XY".

In this plane "YZ", the flexibility of the cable-holder element 2 is not zero but greatly limited, such as to be considered negligible, in such a way as to guarantee at any time the correct support of the cables.

According to the preferred embodiment, the cable-holder element 2 is defined by a chain with articulated links.

In other words, the chain is defined by a series of links, inside of which there is a channel V for housing at least one cable (cable not illustrated in the accompanying drawings).

According to this embodiment, the cable-holder element 2 comprises a plurality of links 2a connected in succession along the line of extension by joining pins 2b, which define axes of rotation perpendicular to the lying plane "XY".

Internally, the cable-holder element 2 defines at least one channel "V" for housing at least one cable (cable not illustrated in the accompanying drawings).

In use, the cable-holder element 2 is installed in such a way that its line of extension is curved, preferably arched.

In other words, the links of the chain are positioned in use to define, in their entirety, an arc.

This geometry directly and substantially influences the performance of the cable-holder element 2.

Advantageously, in fact, thanks to this curvature, the cable-holder element can adapt to the relative movements between the cabins 200 and 300 during the normal operations of the articulated vehicle 100, as illustrated in FIG. 2C.

The device 1 may also comprise two or more cable-holder elements 2, each defining internally at least one channel "V" for housing at least one cable and each extending along a respective line of extension lying substantially on a respective lying plane, on which the cable-holder element is flexible.

Preferably, the two or more cable-holder elements 2 lie in the same lying plane "XY" in such a way as to be flexible in the same lying plane.

In general, each cable-holder element 2 is connected or connectable to the two anchoring plates 3 by respective ends 2c of the cable-holder elements 2.

It should be noted that the cable passing inside the V-shaped housing channel may be an electrical cable or any cable designed to convey a fluid, liquid or air.

In other words, each of the ends 2c of each cable-holder element 2 is connected or connectable to a respective anchoring plate 3.

The anchoring plates 3, in turn, are configured for securely mounting on an end portion 200a, 300a of a respective structure (frame) of the articulated vehicle in such a way that a first anchoring plate 3 is mounted on the cabin 200 whilst a second anchoring plate 3 is mounted on the cabin 300.

The end portions 200a, 300a of the two cabins 200 and 300 face each other.

Moreover, preferably, the end portions 200a, 300a are preferably made at the same height.

The two cabins 200 and 300 are connected to each other by an articulated joint, preferably a fifth wheel.

However, as will become clearer from the following description, the end portions 200a, 300a may be made at different heights.

The anchoring plates 3 are connected to each of the at least one end 2c of the cable-holder element 2 by a connecting element 4.

Preferably, both the anchoring plates 3 are connected to the respective ends 2c of the at least one cable-holder element 2 by a connecting element 4.

The connecting element 4 comprises at least one joint 5 and is configured to allow a reciprocal movement, between the respective end 2c of the cable-holder element 2 and the respective anchoring plate 3, at least about two axes of rotation "A", "B" (which are not parallel and preferably perpendicular to each other).

Preferably, according to the embodiment illustrated, said joint 5 is an articulated joint.

According to an embodiment not illustrated, said joint 5 is an elastic joint. The elastic joint is made of an elastically compliant material.

In that case, it should be noted that said at least about two axes of rotation "A", "B" could be any two axes of rotation about which a mutual rotation is permitted between the respective end 2c of the cable-holder element 2 and the respective anchoring plate 3 following elastic deformation of the joint 5. Reference will be made below to the (articulated) joint 5, meaning that the technical features described can also be applied to the elastic joint, where possible.

Preferably, each articulated joint 5 allows a rotation of at least ±20° about each of the at least two axes of rotation "A", "B".

Preferably, each articulated joint 5 allows a rotation of at least ±30° about each of the at least two axes of rotation "A", "B".

Preferably, each articulated joint 5 allows a rotation of at least ±45° about each of the at least two axes of rotation "A", "B".

Preferably, each articulated joint 5 allows a rotation of less than ±70° about each of the at least two axes of rotation "A", "B".

Preferably, each articulated joint 5 allows a rotation of less than ±60° about each of the at least two axes of rotation "A", "B".

Preferably, each articulated joint 5 allows a rotation of less than ±50° about each of the at least two axes of rotation "A", "B".

The articulated joint 5 may comprise at least one spherical hinge 6.

Preferably, the connecting element 4 comprises two articulated joints 5 connected to each other by a connecting bar 7.

Preferably, both of the two articulated joints 5 are defined by respective spherical hinges 6.

Figure 3:
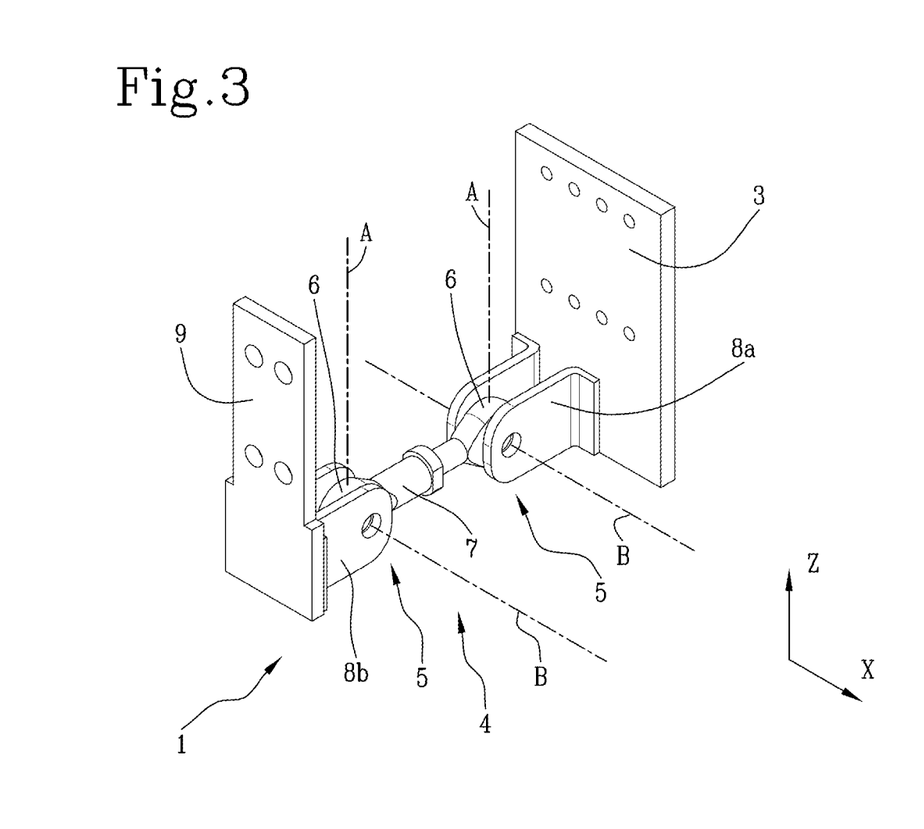
FIG. 3 schematic illustrates a detail of the cable supporting device of FIG. 1.
Figures 4A, 4B:
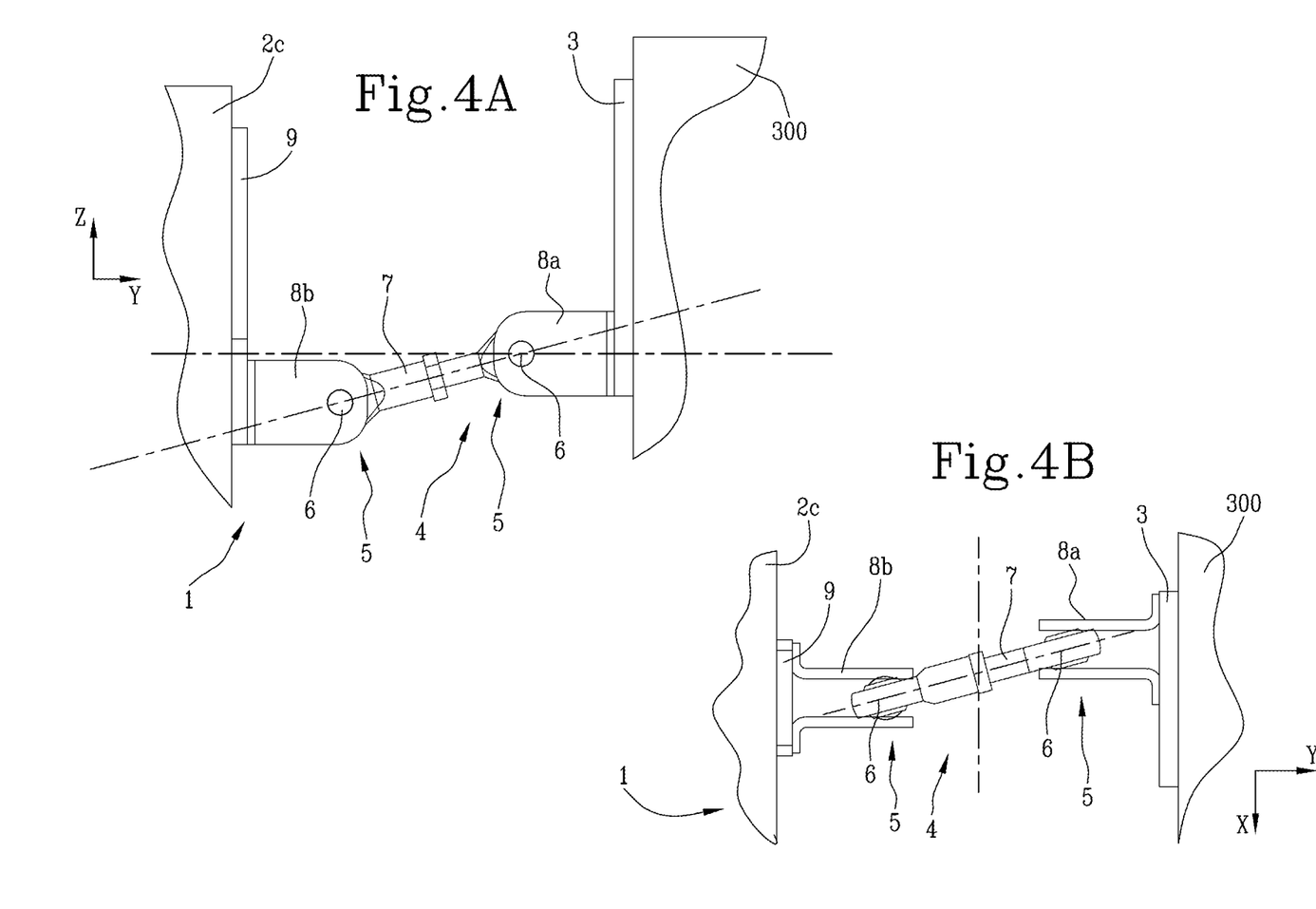
FIGS. 4A-4C schematically illustrate different configurations of use which can be adopted by the cable supporting device.

According to the preferred embodiment, illustrated in particular in FIGS. 3, 4A and 4B, each of the two articulated joints 5 comprises a respective spherical hinge 6.

More specifically, the connecting element 4 comprises a first connecting portion 8a, fixed to the respective anchoring plate 3 and a second connecting portion 8b, fixed or integrally connected to the respective at least one end 2c of the cable-holder element 2, where the first and second connecting portions 8a, 8b are connected to each other by the connecting bar 7.

Preferably, the first and second connecting portions 8a, 8b are defined by respective brackets.

Advantageously, the connecting element 4, comprising, according to a non-limiting example embodiment, two spherical hinges 6, allows the respective end 2c to move relative to the respective anchoring plate 3 along a portion of spherical surface.

Moreover, the use of two connecting elements 4, both comprising two spherical hinges 6, allows the cable-holder element 2 to translate vertically and horizontally, thus avoiding tensioning (which could result in breakage) at the point of connection with the structures (frame) of the cabins 200, 300.

FIG. 4A shows an example of vertical translation of the cable-holder element 2 relative to the cabin 300 whilst FIG. 4B shows an example of horizontal translation of the cable-holder element 2 relative to the same cabin 300.

Figure 4C:
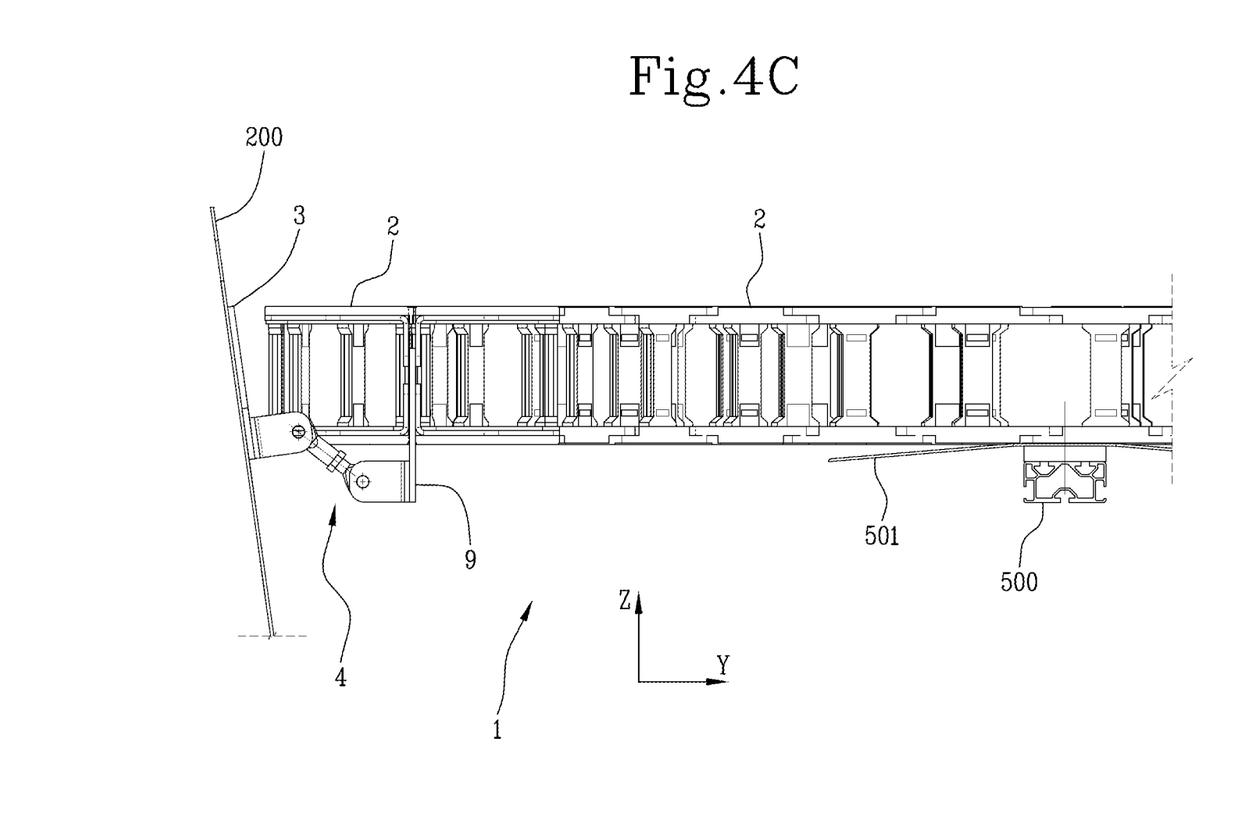

Further, FIG. 4C shows an example of a mutual inclination between the cabins 200 and the lying plane "XY" of the cable-holder elements 2.

As may be clearly inferred from the drawings, the device 1 can absorb (reduce) the stresses (tensions) deriving from the misalignment of the cabins 200, 300 irrespective of the plane in which they occur and adapt without damage to the various reciprocal configurations adopted by the cabins 200, 300.

According to a further embodiment not illustrated, the connecting element 4 comprises two articulated joints 5, one for each end, defined by two respective hinges 6 which allow the rotation each about its respective axis of rotation.

The hinges are structured and oriented in such a way that their axes of rotation are distinct and perpendicular to each other.

In this way, the connecting element 4 allows equally the cable-holder element 2, and in particular its end 2c, to move on two axes of rotation relative to the anchoring plate 3 to which it is connected.

In order to make the constraint between the end 2c of the cable-holder element 2 and the respective connecting element 4 (more specifically the joint 5) more efficient, use is also made of supporting plates 9.

Each supporting plate 9 is interposed between the end 2c of the cable-holder element 2 and the respective connecting element 4 to which the supporting plate 9 is rigidly connected in an integral fashion.

Moreover, preferably, each supporting plate 9 is oriented parallel to the respective anchoring plate 3 in an alignment configuration between the two cabins 200, 300 of the articulated vehicle 100.

Advantageously, it is possible to fix integrally to the same connecting plate 9 the ends 2c of several cable-holder elements 2, when present in the device 1.

The device 1 may also comprise an intermediate supporting frame 500 configured for supporting, in particular by sliding, an intermediate portion of the cable-holder element 2.

Preferably, the intermediate support frame 500, installed in the intercommunicating compartment 400, is connected or connectable to a respective structure of the articulated vehicle, in particular to the connecting structure of the cabins 200 and 300.

In particular, the intermediate support frame 500 is connected or connectable to the fifth wheel.

Preferably, the intermediate support frame 500 has (comprises) an element 500a for installing a flat support 500b suitable for receiving an intermediate portion of the cable-holder element 2.

It should be noted that the flat support 500b only has the supporting function: it does not guide in any way the cable-holder element 2.

The flat support 500b is configured to allow a low friction sliding of the cable-holder element 2.

The flat support 500b is defined by a plate.

Advantageously, the intermediate support frame 500 makes it possible to support at least partly the weight force of the cable-holder element 2 and of the cables, reducing the overall load which acts on the connecting elements 4 and also the weight force which must be directly supported by the cable-holder element 2.

The invention also relates to an articulated vehicle 100, in particular a bus, comprising two adjacent cabins 200, 300 separated from each other by an intercommunicating compartment 400 and comprising the cable supporting device 1.

The articulated vehicle 100 also comprises cables (electrical or designed to allow the passage of a fluid, air or liquid).

In particular, each end of the at least one cable-holder element 2, forming part of the device 1, is applied to an end portion 200a, 300a of a respective cabin 200, 300, preferably at a top portion of the respective cabin 200, 300.

Advantageously, the device 1 and the articulated vehicle 100 described above are able to overcome the drawbacks of the prior art.

In fact, the cable supporting device 1 is able to withstand the mechanical stresses caused by the movement of the articulated vehicle 100 thanks to the structure of the connecting elements 4 which allow the at least one cable-holder element 2 to be oriented relative to cabins 200, 300 (in this way reducing stresses).

What is claimed is:

1. A device for supporting cables for articulated vehicles, configured for installation in an intercommunicating compartment between two adjacent cabins of an articulated vehicle, comprising at least one cable-holder element defining internally at least one channel for housing at least one cable, said at least one cable-holder element extending along a line of extension lying substantially in a plane and being flexible on said plane;
    two anchoring plates connected or connectable to respective ends of the at least one cable-holder element and each configured for a stable mounting to an end portion of a respective frame structure of said articulated vehicle;
    at least one connecting element, positioned for connecting between at least one of said ends of the at least one cable-holder element and a respective one of the two anchoring plates, comprising at least one joint configured to allow a reciprocal movement, between the at least one of said ends of the at least one cable-holder element and the respective one of the two anchor plates, at least about two axes of rotation which are not parallel and are perpendicular.

2. The device according to claim 1, wherein said at least one joint is an articulated joint.

3. The device according to claim 1, wherein said at least one joint is an elastic joint.

4. The device according to claim 1, wherein said at least one cable-holder element is defined by a chain with articulated links, comprising a plurality of links connected in succession along said line of extension by joining pins defining axes of rotation perpendicular to said plane.

5. The device according to claim 1, wherein said at least one joint comprises at least one spherical hinge.

6. The device according to claim 1, wherein said at least one joint comprises two joints, and the at least one connecting element comprises the two joints connected to each other by a connecting bar, the two joints comprising, respectively, a first connecting portion, fixed to the respective one of the two anchoring plates, and a second connecting portion, fixed to the respective end of the at least one cable-holder element, said first and second connecting portions being connected to opposite ends of said connecting bar, and wherein the two joints are articulated joints.

7. The device according to claim 1, wherein said at least one joint allows a rotation of at least ±30° about each of said at least two axes of rotation.

8. The device according to claim 1, wherein the at least one conencting element comprises two connecting elements each interposed between a respective end of the at least one cable-holder element and the respective one of the two anchoring plates.

9. The device according to claim 1, comprising an intermediate supporting frame configured for supporting, an intermediate portion of said at least one cable-holder element and connected or connectable to a respective structure of said articulated vehicle.

10. The device according to claim 1, wherein each of the at least one connecting element is connected to one of the respective ends of the at least one cable-holder element by a supporting plate rigidly fixed to the one of the respective ends of the at lest one cable-holder element and is oriented parallel to the respective one of the two ancor plates plate in an alignment configuration between the two adjacent cabins of the articulated vehicle.

11. The device according to claim 1, wherein the at least one cable-holder element comprises two or more cable-holder elements each forming internally at least one channel for housing at least one cable and extending along a respective line of extension substantially lying in a plane and flexible on the plane, and wherein said two or more cable-holder elements have relative first and/or second ends connected to a same one of the at least one connecting element.

12. An articulated vehicle, comprising two cabins adjacent to each other separated by an intercommunicating compartment and also comprising the device according to claim 1, wherein each end of said at least one cable-holder element is applied to an end portion of a respective one of the two cabins.

* * * * *